S. E. DOUGLASS.
HEAD REST.
APPLICATION FILED DEC. 13, 1913.

1,155,223. Patented Sept. 28, 1915.

Inventor
S. E. Douglass.

Witnesses

By

Attorney

UNITED STATES PATENT OFFICE.

SAMUEL E. DOUGLASS, OF MOUNT GILEAD, NORTH CAROLINA.

HEAD-REST.

1,155,223.  Specification of Letters Patent.  Patented Sept. 28, 1915.

Application filed December 13, 1913. Serial No. 806,517.

*To all whom it may concern:*

Be it known that I, SAMUEL E. DOUGLASS, a citizen of the United States, residing at Mount Gilead, in the county of Montgomery and State of North Carolina, have invented certain new and useful Improvements in Head-Rests; and I do hereby declare the following to be a full, clear, and exact description of the invention, such as will enable others skilled in the art to which it appertains to make and use the same.

This invention relates to head rests, designed more particularly for use of travelers, and one of the principal objects of the invention is to provide a head rest which may be readily attached to any form of arm of seat in passenger coaches or in waiting rooms of railway stations and which will be provided with spring metal clips for attaching the same to the arms of seats, said clips being so mounted upon the head rest support that they may be turned independently to conform to any shape of arm.

Another object of the invention is to provide a head rest which may be readily packed within a small pocket for carrying the same within a suit case or traveling bag.

These and other objects may be attained by means of the construction illustrated in the accompanying drawings, in which,—

Figure 1:
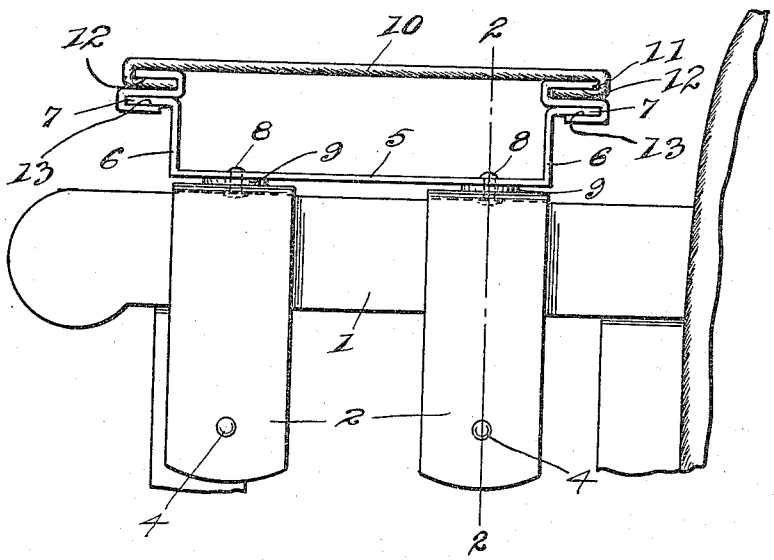
Figure 2:
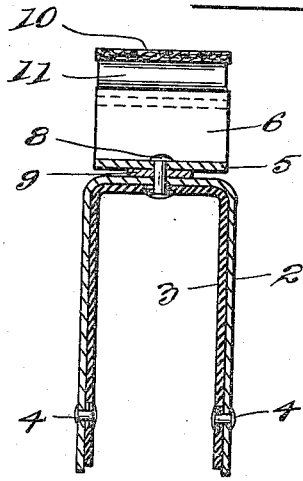
Figure 3:
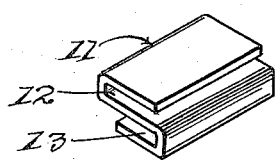

Figure 1 is a side elevation of a head rest connected to the arm of a seat of a passenger coach, Fig. 2 is a sectional view taken on the line 2—2 of Fig. 1, and Fig. 3 is a perspective view of a clip for holding the cushion secured to the head rest support.

Referring to the drawings the numeral 1 designates the arm of a passenger coach seat, and 2 are the spring metal clips for attaching the head rest to the arm 1. The clips 2 are substantially U-shaped and are made of spring metal and provided with a suitable lining 3 to prevent marring the arm of the seat, said lining being secured within the clip by means of rivets, or other suitable fastenings, 4. The head rest support is formed of a strip of sheet metal comprising a base 5, upwardly turned end 6, and outwardly bent terminals 7. The head rest support is connected to the clips 2 by means of rivets 8 which extend through the base portion 5 of the head rest support and through a washer 9 and through the cross member of the clips 2, and the lining 3, as shown more clearly in Fig. 2.

The supporting element 10 may be formed of a piece of suitable webbing or other similar material, and the ends of the strip are connected to an S-shaped clip 11, formed of resilient metal and provided with oppositely disposed clamping grooves 12 and 13, as shown more clearly in Fig. 3. The terminals of the webbing 10 are engaged in the groove 12 and the ends of the oppositely extending portion 7 of the head rest support are disposed in the groove 13 in said clip, as clearly illustrated in Fig. 1 of the drawing.

From the foregoing it will be obvious that the resilient clips 2 are pivotally connected to the head rest support and may be turned in any direction to conform to the contour of the arm of the seat. It will also be obvious that the entire device occupies but little space and can be readily packed within a suit case or traveling bag, and is always ready for use.

The invention may be manufactured at low cost, is simple in construction, and is durable and efficient for its purpose.

What is claimed is:—

1. In a head rest including a pair of U-shaped spring clips, a support formed of a strip of metal having a base, said base having its ends turned upwardly and outwardly, said base pivotally connected to said U-shaped clips, an S shaped clip adapted to removably engage the outwardly extending ends of said support, a head resting element attached to said S-shaped clip for supporting a head thereon.

2. In a head support, a pair of U-shaped spring clips, a support formed of a flat strip of metal, said support having a base, the outer ends turned upwardly and outwardly, said base being pivotally connected to said U-shaped clips, an S-shaped clip adapted to engage the outwardly extending end of said base, a head supporting element having its ends secured in the upper end of said S-shaped clip, the inner faces of said U-shaped spring clips being lined with felt preventing said clips from marring the arm of a seat or chair when placed thereupon.

In testimony whereof I affix my signature in presence of two witnesses.

SAMUEL E. DOUGLASS.

Witnesses:
JOHN A. McAULAY,
W. A. McAVERY.

Copies of this patent may be obtained for five cents each, by addressing the "Commissioner of Patents, Washington, D. C."